United States Patent
Arata et al.

(10) Patent No.: US 9,035,493 B2
(45) Date of Patent: May 19, 2015

(54) POWER-FLUCTUATION REDUCING APPARATUS FOR POWER GENERATION SYSTEM

(75) Inventors: Masanori Arata, Yokohama (JP); Yoshihiro Taniyama, Tokyo (JP); Kazuya Yasui, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 766 days.

(21) Appl. No.: 13/205,981

(22) Filed: Aug. 9, 2011

(65) Prior Publication Data

US 2012/0038212 A1 Feb. 16, 2012

(30) Foreign Application Priority Data

Aug. 10, 2010 (JP) ................. 2010-179630

(51) Int. Cl.
*H02J 1/12* (2006.01)
*H02J 3/32* (2006.01)
*H02J 3/34* (2006.01)
*H02J 7/00* (2006.01)
*H02J 9/06* (2006.01)
*H02J 3/38* (2006.01)

(52) U.S. Cl.
CPC ............... *H02J 3/32* (2013.01); *H02J 7/0016* (2013.01); *H02J 7/0022* (2013.01); *H02J 9/062* (2013.01); *Y02E 70/30* (2013.01); *H02J 3/386* (2013.01); *Y02E 10/763* (2013.01)

(58) Field of Classification Search
CPC ............... H02J 3/32; H02J 9/062; H02J 7/34; H02J 9/061; H02J 3/382

USPC .......... 307/42–48, 104, 109; 363/37; 700/291
See application file for complete search history.

(56) References Cited

U.S. PATENT DOCUMENTS

| | | | |
|---|---|---|---|
| 6,208,039 | B1 | 3/2001 | Mendelsohn et al. |
| 6,680,600 | B2 | 1/2004 | Emori et al. |
| 6,700,349 | B2 | 3/2004 | Emori et al. |
| 6,747,438 | B2 | 6/2004 | Emori et al. |
| 6,917,181 | B2 | 7/2005 | Emori et al. |
| 6,977,480 | B2 | 12/2005 | Emori et al. |
| 7,075,306 | B2 | 7/2006 | Emori et al. |
| 7,319,333 | B2 | 1/2008 | Emori et al. |
| 7,692,430 | B2 | 4/2010 | Emori et al. |
| 8,120,365 | B2 | 2/2012 | Emori et al. |

(Continued)

FOREIGN PATENT DOCUMENTS

| | | |
|---|---|---|
| EP | 1 022 838 A2 | 7/2000 |
| JP | 06-283210 A | 10/1994 |

(Continued)

*Primary Examiner* — Rexford Barnie
*Assistant Examiner* — Jagdeep Dhillon
(74) *Attorney, Agent, or Firm* — Foley & Lardner LLP (57) ABSTRACT

According to one embodiment, there is provided a power-fluctuation reducing apparatus in a power generation system to control a converter connected to the power generation system and connected to secondary batteries. The power-fluctuation reducing apparatus includes adjusting direct current voltages output from the secondary batteries, respectively, detecting the directing current voltages output from the secondary batteries, respectively, controlling to adjust the direct current voltages output from the secondary batteries to make the direct current voltages uniform, based on the detected direct current voltages, and controlling the converter to reduce power fluctuations in the power generation system.

7 Claims, 6 Drawing Sheets

(56) References Cited

U.S. PATENT DOCUMENTS

| | | |
|---|---|---|
| 2003/0007370 A1* | 1/2003 | Winter .......................... 363/37 |
| 2003/0094923 A1 | 5/2003 | Emori et al. |
| 2003/0094926 A1 | 5/2003 | Emori et al. |
| 2003/0094928 A1 | 5/2003 | Emori et al. |
| 2004/0138785 A1 | 7/2004 | Emori et al. |
| 2004/0160209 A1 | 8/2004 | Emori et al. |
| 2005/0083722 A1 | 4/2005 | Emori et al. |
| 2006/0012372 A1 | 1/2006 | Emori et al. |
| 2006/0109008 A1 | 5/2006 | Emori et al. |
| 2008/0084179 A1 | 4/2008 | Emori et al. |
| 2009/0069950 A1* | 3/2009 | Kurokami et al. ............ 700/291 |
| 2010/0040939 A1 | 2/2010 | Maegawa et al. |
| 2010/0148728 A1 | 6/2010 | Emori et al. |
| 2010/0187907 A1* | 7/2010 | Toba et al. ....................... 307/48 |
| 2011/0279085 A1 | 11/2011 | Shigemizu et al. |

FOREIGN PATENT DOCUMENTS

| | | |
|---|---|---|
| JP | 2001-095163 A | 4/2001 |
| JP | 2001-157382 A | 6/2001 |
| JP | 2002-354697 A | 12/2002 |
| JP | 2003-014828 A | 1/2003 |
| JP | 2003-164068 A | 6/2003 |
| JP | 2004-215459 A | 7/2004 |
| JP | 2007-060796 A | 3/2007 |
| JP | 2007-201257 A | 8/2007 |
| JP | 2007-209092 A | 8/2007 |
| JP | 2009-027797 A | 2/2009 |
| JP | 2009-261076 A | 11/2009 |
| JP | 2010-045002 A | 2/2010 |
| JP | 2010-051106 A | 3/2010 |
| JP | 2010-141970 A | 6/2010 |
| WO | WO 2009/155986 A1 | 12/2009 |

* cited by examiner

POWER-FLUCTUATION REDUCING APPARATUS FOR POWER GENERATION SYSTEM

CROSS-REFERENCE TO RELATED APPLICATIONS

This application is based upon and claims the benefit of priority from prior Japanese Patent Application No. 2010-179630, filed Aug. 10, 2010, the entire contents of which are incorporated herein by reference.

FIELD

Embodiments described herein relate generally to a power-fluctuation reducing apparatus and a power fluctuation reducing method for a power generation system.

BACKGROUND

In recent years, systems which generate electric power by converting natural energy such as wind power or sunlight into electric energy are increasingly introduced, for the purpose of reducing environmental loads. Such power dependent on natural energy is greatly influenced by weather conditions. Therefore, power generated from natural energy easily fluctuates. If a system cannot sufficiently adjust to fluctuations in the generated power, a voltage fluctuation or power cut occurs due to the load.

If a thermal power plant is put on standby as a substitute power to avoid such a situation, however, a maintenance cost such as a fuel cost increases. Therefore, a power generation system using natural energy demanded to be capable of restricting power fluctuations by itself.

On the other side, hybrid cars and electric cars are rapidly being introduced in connection with promotion of environmental load reduction. Batteries are mounted as power sources in these cars. Therefore, in the future, a large number of secondary batteries are expected to be disposed of when the cars are discarded. Consequently, dealing with those secondary batteries is also expected to cause problems.

However, a problem described below occurs if a power-fluctuation reducing apparatus which reduces power fluctuations in a power generation system by charging/discharging secondary batteries is configured by using secondary batteries to be reused, in view of the situation described above.

There are various types of secondary batteries. If batteries of an identical type are made of different terminal materials or by different manufacturers, the batteries have respectively different voltages between ends of the batteries. Further, individual differences increase between reused secondary batteries due to use conditions, use periods, use environments, or the like.

When secondary batteries of such different styles are used to construct a power-fluctuation reducing apparatus, partial heat generation may be caused by a circulation current between batteries or a stored power amount may be decreased due to unevenness in voltage allotment between constitutive batteries.

DETAILED DESCRIPTION

In general, according to one embodiment, there is provided a power-fluctuation reducing apparatus in a power generation system to control a converter connected to the power generation system and connected to secondary batteries. The power-fluctuation reducing apparatus includes adjusting direct current voltages output from the secondary batteries, respectively; detecting the directing current voltages output from the secondary batteries, respectively; controlling to adjust the direct current voltages output from the secondary batteries to make the direct current voltages uniform, based on the detected direct current voltages; and controlling the converter to reduce power fluctuations in the power generation system.

Hereinafter, embodiments will be described with reference to the drawings.

First Embodiment

Figure 1:
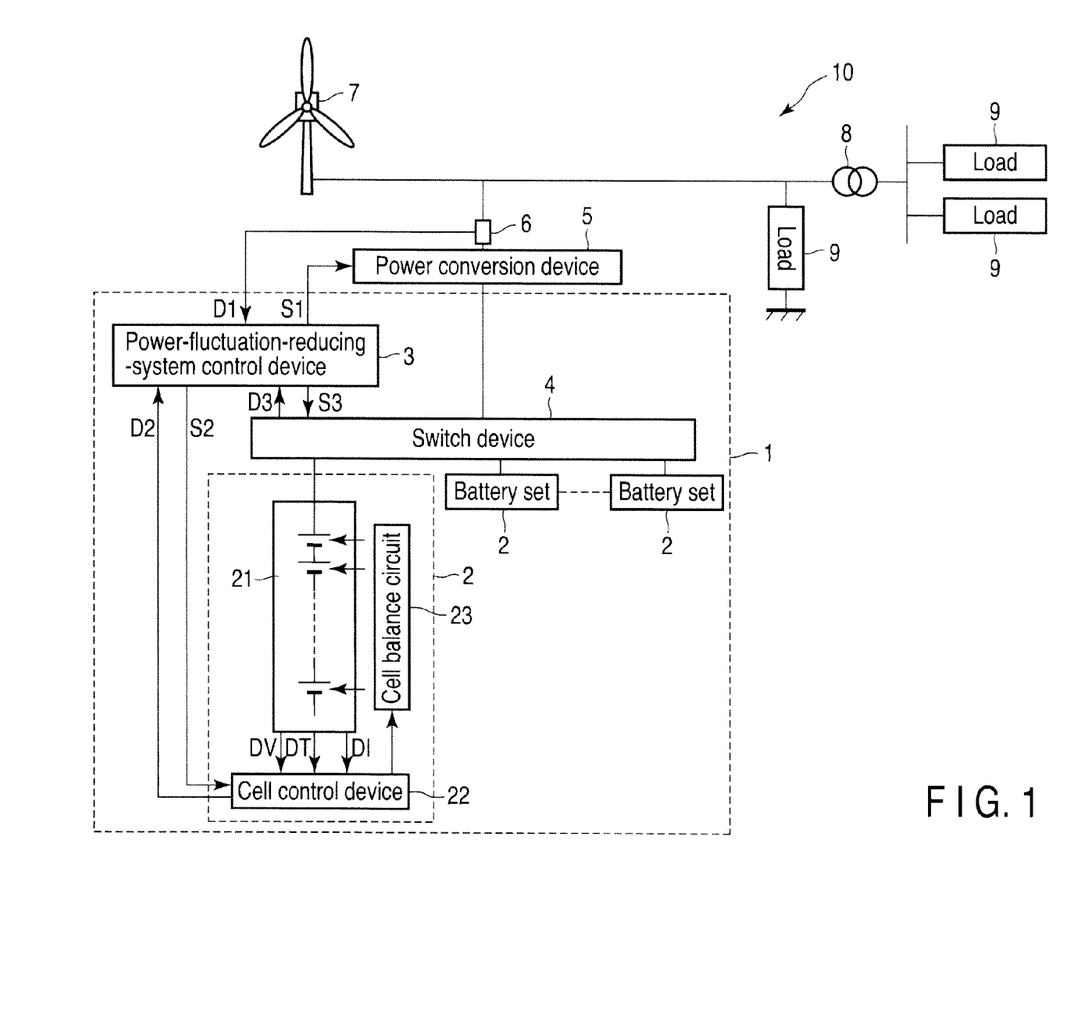
FIG. 1 is a block diagram showing a configuration of a power generation system to which a power-fluctuation reducing apparatus according to the first embodiment is applied.

FIG. 1 is a block diagram showing a configuration of a power generation system 10 to which a power-fluctuation reducing apparatus 1 according to the first embodiment is applied. Parts which are common to subsequent figures will be denoted by common reference symbols. Detailed descriptions of the common parts will be omitted, and descriptions will be made mainly on different parts. Reiterative descriptions will also be omitted from embodiments described below.

The power generation system 10 supplies loads 9 with an electric power generated by a wind power generator 7. The loads 9 are electrically connected to the wind power generator 7. The loads 9 may be connected to the wind power generator 7 either through or without a transformer 8. The power-fluctuation reducing apparatus 1 is connected to a power system (i.e., a power system which supplies the loads 9 from the wind power generator 7) of the power generation system 10 through a power conversion device 5. In an alternating current side of the power conversion device 5, there is provided an electric-quantity measuring device 6 for grasping a state of the power system of the power generation system 10.

The wind power generator 7 utilizes wind power, which is natural energy.

The power conversion device 5 makes the power-fluctuation reducing apparatus 1 charge/discharge electricity by a power conversion operation, to thereby reduce power fluctuations in the power generation system 10. When the power generated by the wind power generator 7 is low, the power conversion device 5 converts a direct current power supplied from the power-fluctuation reducing apparatus 1 into an alternating current power, and supplies the alternating current power for the power system of the power generation system 10. When the power generated by the power generator 7 is excess, the power conversion device 5 converts the excess alternating current power of the power system of the power generation system 10 into a direct current power, to thereby electrically charge the power-fluctuation reducing apparatus 1.

The electric-quantity measuring device 6 measures electric quantities which indicates a state of the power system of the power generation system 10. The electric quantities measured by the electric-quantity measuring device 6 are a voltage, an electric current, an electric power, an active power, or a reactive power. The electric-quantity measuring device 6 outputs measured electric quantities as system information D1 to the power-fluctuation reducing apparatus 1.

Based on system information D1 measured by the electric-quantity measuring device 6, the power-fluctuation reducing apparatus 1 outputs a control signal S1 for controlling the power conversion device 5. In this manner, the power-fluctuation reducing apparatus 1 reduces power fluctuations in the power system of the power generation system 10 by the power conversion device 5.

The power-fluctuation reducing apparatus 1 includes battery sets 2 and a power-fluctuation reducing system. The power-fluctuation reducing system includes a power-fluctuation-reducing-system control device 3 and a switch device 4.

The power-fluctuation-reducing-system control device 3 is a part which performs calculation processing concerning control of the power-fluctuation reducing apparatus 1. The power-fluctuation-reducing-system control device 3 outputs the control signal S1 to the power conversion device 5, and controls the power conversion device 5. The power-fluctuation-reducing-system control device 3 also outputs a control signal S2, and controls each battery set 2. The power-fluctuation-reducing-system control device 3 also outputs a control signal S3 to the switch device 4, and controls the switch device 4. The power-fluctuation-reducing-system control device 3 receives the system information D1 from the electric-quantity measuring device 6. The power-fluctuation-reducing-system control device 3 also receives battery set information D2 from each battery set 2. The power-fluctuation-reducing-system control device 3 receives, as input voltage information D3 from each battery set 2, an input voltage input from each battery set 2 to the switch device 4.

The switch device 4 adjusts a voltage output from each battery set 2 and outputs the voltage to a direct current side of the power conversion device 5. In this manner, the switch device 4 relays exchange of electric power between the battery sets 2 and the power conversion device 5.

The battery sets 2 are connected to the switch device 4. The battery sets 2 are secondary batteries. The battery sets 2 reduce power fluctuations in the power system of the power generation system 10 by charge or discharge. The battery sets 2 include battery sets of various types or in various states (such as second-hand batteries or new batteries). Even when second-hand battery sets 2 are used, the use state, use periods, or use environments may vary. The following description will be mainly made of one battery set 2 among a plurality of battery sets 2. The other battery sets 2 are each the same as the one battery set 2. Descriptions thereof will be omitted herefrom.

The battery set 2 includes a cell unit 21, a cell control device 22, and a cell balance circuit 23.

The cell unit 21 is configured by connecting cells as unit batteries in series or parallel. The battery sets 2 are made to charge or discharge electricity by the cell unit 21.

Based on the control signal S2 received from the power-fluctuation-reducing-system control device 3, the cell control device 22 controls the cell unit 21 through the cell balance circuit 23. The control signal S2 is a charge command or a discharge command which makes the cell unit 21 charge/discharge electricity. The cell control device 22 receives information concerning operation states of respective cells, such as voltage information DV, current information DI, or temperature information DT. The cell control device 22 transmits, as battery set information D2, the received information concerning the operation states of respective cells to the power-fluctuation-reducing-system control device 3.

The cell balance circuit 23 monitors states of the cells forming the cell unit 21. The cell balance circuit 23 performs a processing for making voltages or charge states of the cells uniform. When the cell balance circuit 23 receives a charge command or a discharge command from the cell control device 22, the cell balance circuit 23 then controls the cell unit 21 to charge or discharge electricity in a manner that voltages or charge states of the cells are uniform.

Figure 2:
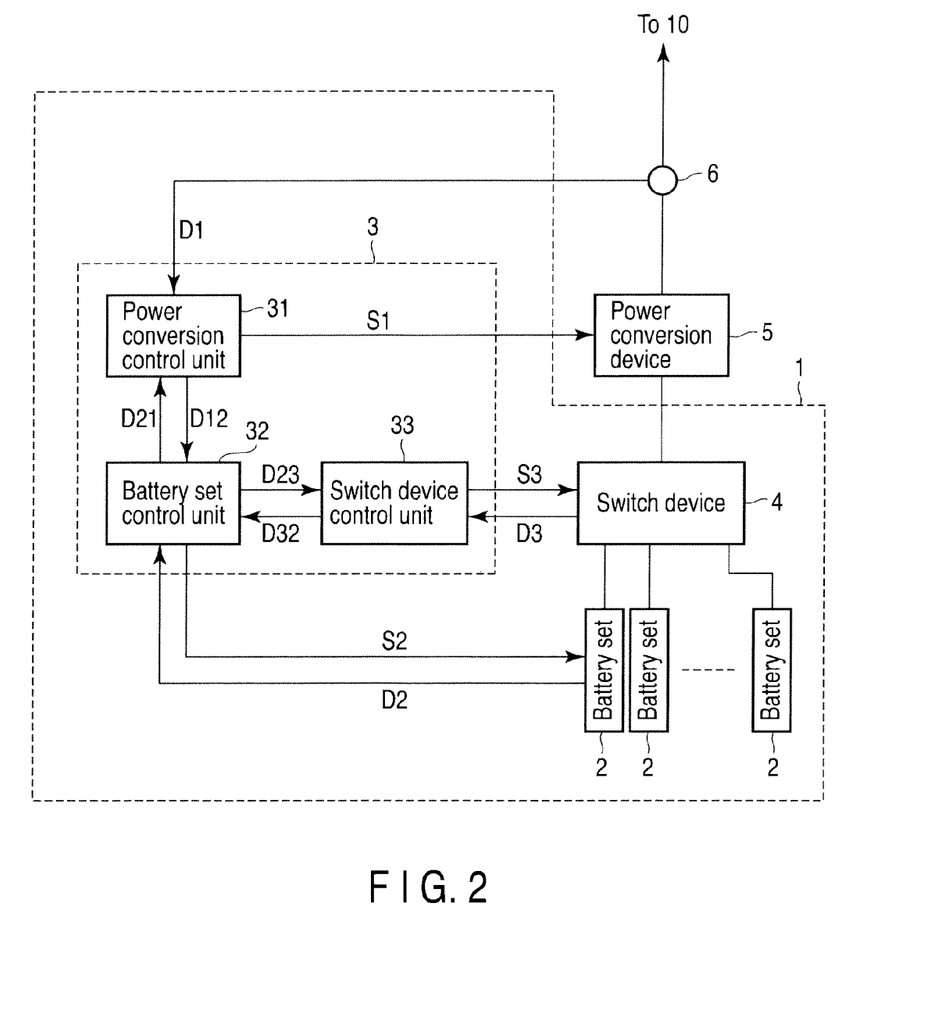
FIG. 2 is a block diagram showing a configuration of the power-fluctuation reducing apparatus to which a power-fluctuation-reducing-system control device according to the first embodiment is applied.

FIG. 2 is a block diagram showing a configuration of the power-fluctuation reducing apparatus 1 to which the power-fluctuation-reducing-system control device 3 according to the present embodiment is applied.

The power-fluctuation-reducing-system control device 3 includes a power-conversion control unit 31, a battery-set control unit 32, and a switch-device control unit 33.

The power-conversion control unit 31 receives system information D1 from the electric-quantity measuring device 6. The power-conversion control unit 31 receives information D21 concerning the battery sets 2 from the battery-set control unit 32. The information D21 concerning the battery sets 2 includes a state of charge (SOC) (such as a charge rate) as a total sum of all the battery sets. Based on the system information D1 and the information D21 concerning the battery sets 2, the power-conversion control unit 31 determines the content of control (such as charge or discharge) for the power-fluctuation reducing apparatus 1. The power-conversion control unit 31 controls the power conversion device 5 and battery sets 2 in accordance with the determined content of control.

For example, the power-conversion control unit 31 determines the content of control as follows.

The power-conversion control unit 31 grasps power fluctuations in the power system of the power generation system 10, based on the system information D1. The power-conversion control unit 31 controls charge/discharge of each battery set 2 so as to suppress the power fluctuation. When the battery sets 2 are charged, the power-conversion control unit 31 outputs the information D12 which requests the battery-set control unit 32 to electrically charge the battery sets 2, and outputs the control signal S1 to the power conversion device 5 so as to charge the power-fluctuation reducing apparatus 1 with excess electric power. When the battery sets 2 are made to discharge electricity, the power-conversion control unit 31 outputs the information D12 to request the battery-set control unit 32 to make the battery sets 2 discharge electricity, and also outputs the control signal S1 to the power conversion device 5 so as to supply the electric power to the power system of the power generation system 10.

The battery-set control unit 32 receives the battery set information D2 from each battery set 2. The battery-set control unit 32 receives the information D12 from the power-conversion control unit 31. The battery-set control unit 32 receives information D32 from the switch-device control unit 33. The information D32 includes information concerning the input voltage input from each battery set 2 to the switch device 4. The battery-set control unit 32 determines the content of control for each battery set 2 (such as charge, discharge, or stop of each battery set 2), based on the battery set informations D2 received from the battery sets 2 and based on the information D32 received from the switch-device control unit 33. Based on the battery set informations D2, the battery-set control unit 32 generates the information D21 concerning the battery sets 2 to be transmitted to the power-conversion control unit 31.

When the battery sets 2 are charged, the battery-set control unit 32 outputs control signals S2 each including a charge command, respectively to the battery sets 2, and transmits the information D23 required for controlling the switch device 4, to the switch-device control unit 33. When the battery sets 2 are made to discharge electricity, the battery-set control unit 32 outputs control signals 2 each including a discharge command or a discharge voltage command for controlling a discharge voltage, respectively to the battery sets 2, and transmits the information D23 required for controlling the switch device 4 to the switch-device control unit 33.

For example, the battery-set control unit 32 determines the content of control as follows.

Based on the voltage information DV and current information DI included in the information D21 concerning each battery set 2, the battery-set control unit 32 performs control to make the output power of each battery set 2 uniform. In this manner, the output power is prevented from being biased to a particular battery set 2.

Based on the information 921 concerning each battery set 2, the battery-set control unit 32 measures the SOC for each battery set 2. The battery-set control unit 32 performs control to make the SOC of each battery set 2 uniform.

The battery-set control unit 32 controls the temperature of each battery set 2 to fall within a constant range, based on the temperature information DT included in the information D21 concerning each battery set 2. This is because the battery sets 2 may cause a problem when temperatures of the battery sets 2 are too high and also because the charge/discharge efficiency of the battery sets 2 lowers when the temperatures of the battery sets 2 are too low.

The switch-device control unit 33 receives the information D23 concerning charge/discharge of each battery set 2 from the battery-set control unit 32. The switch-device control unit 33 receives input voltage information D3 from the switch device 4. Based on the input voltage information D3, the switch-device control unit 33 generates the information D32 concerning an input voltage to each battery set 2, which is transmitted to the battery-set control unit 32. Based on the information D23 concerning charge/discharge of each battery set 2 and input voltage information D3, the switch-device control unit 33 outputs the control signal S3 including a control command for controlling the switch device 4.

Figure 3:
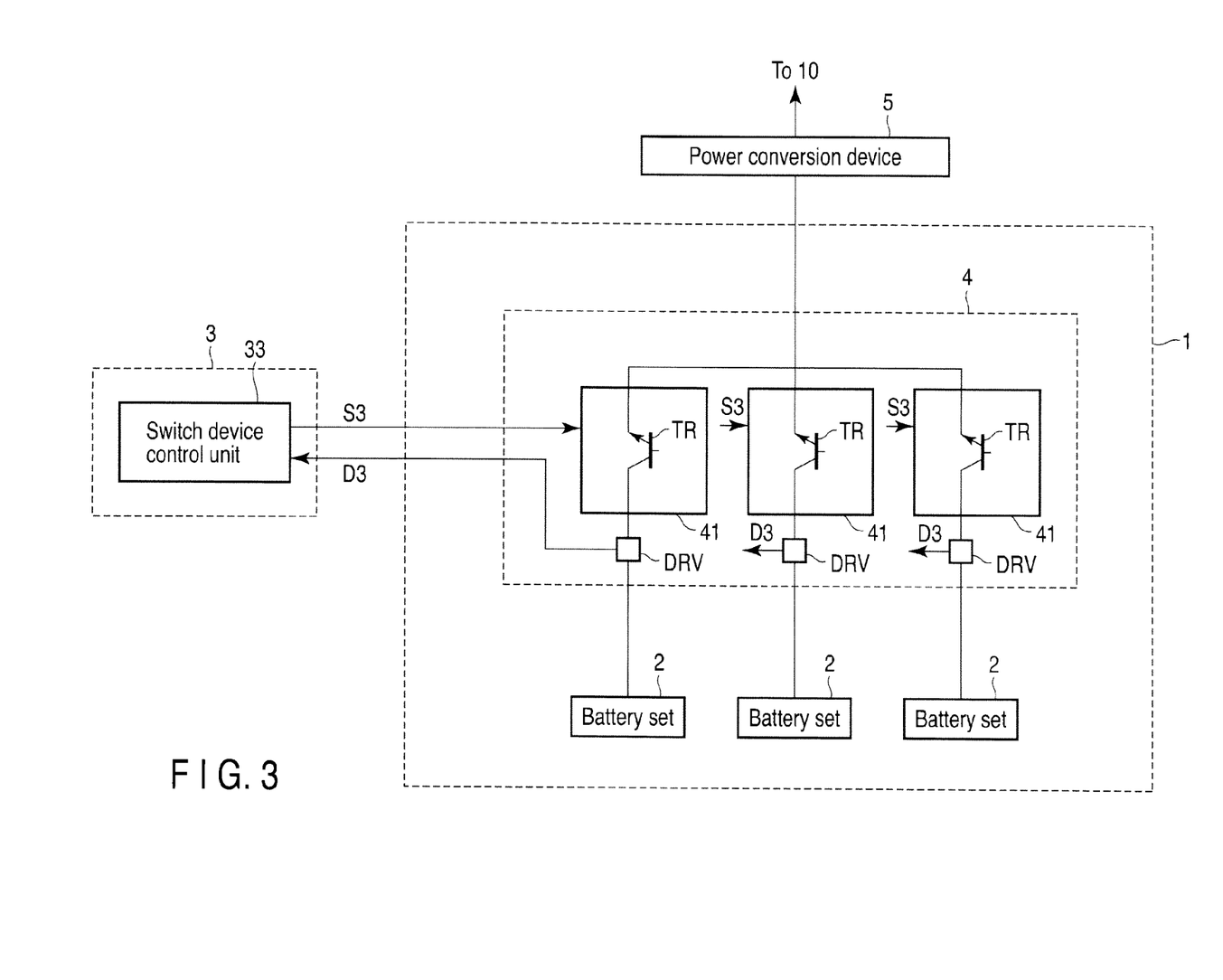
FIG. 3 is a block diagram showing a configuration of a switch device according to the first embodiment.

FIG. 3 is a block diagram showing a configuration of the switch device 4 according to the embodiment.

The switch device 4 is provided with chopper circuits 41 configured by using switching elements TR such as power transistors, respectively corresponding to the battery sets 2. The chopper circuits 41 are circuits for adjusting direct current voltages output from the respectively corresponding battery sets 2.

In a side of the chopper circuits 41 connected to the battery sets 2, voltage detectors DRV are provided to detect voltages input from the battery sets 2. The voltage detectors DRV output detected input voltages of the battery sets 2, as the input voltage information D3, to the switch-device control unit 33.

Based on the detected input voltages of the battery sets 2, respectively, the switch-device control unit 33 outputs the control signals S3 for adjusting voltage values to be output to a direct current side of the power conversion device 5, to the corresponding chopper circuits 41 as control targets to adjust. The switch-device control unit 33 controls the chopper circuits 41 so that no circulation current may flow between the battery sets 2 and that voltage division is uniform between the battery sets 2. The chopper circuits 41 control input voltages from the battery sets 2 as the switching elements TR which are constitutive elements of the chopper circuits 41 are controlled to turn on/off.

Parts of the switch device 4 which are connected to sides of all the chopper circuits 41 connected to the power conversion device 5 are short-circuited. In this configuration, all the battery sets 2 are connected in parallel when the plurality of battery sets 2 are connected to the switch device 4. The switch device 4 outputs a direct current power obtained by synthesizing the output voltages of the battery sets 2 adjusted by the chopper circuits 41, to the direct current side of the power conversion device 5.

According to the present embodiment, output voltages output from the battery sets 2 can be individually adjusted by the switch device 4. Accordingly, voltage division can be made uniform between the battery sets 2 without flowing a circulation current between arbitrary ones of the battery sets 2. In addition, a direct current power obtained by synthesizing output voltages of the battery sets 2 by parallel connection can be output to the power conversion device 5.

Therefore, the power-fluctuation reducing apparatus 1 can be configured even by using the various secondary batteries for the battery sets 2. For example, when reused secondary batteries are used for the battery sets 2, the power-fluctuation reducing apparatus 1 is configured by using various secondary batteries of various styles. Even in this case, the power-fluctuation reducing apparatus 1 can be operated without causing a problem between battery sets 2 (such as a circulation current caused by differences between terminal voltages).

Second Embodiment

Figure 4:
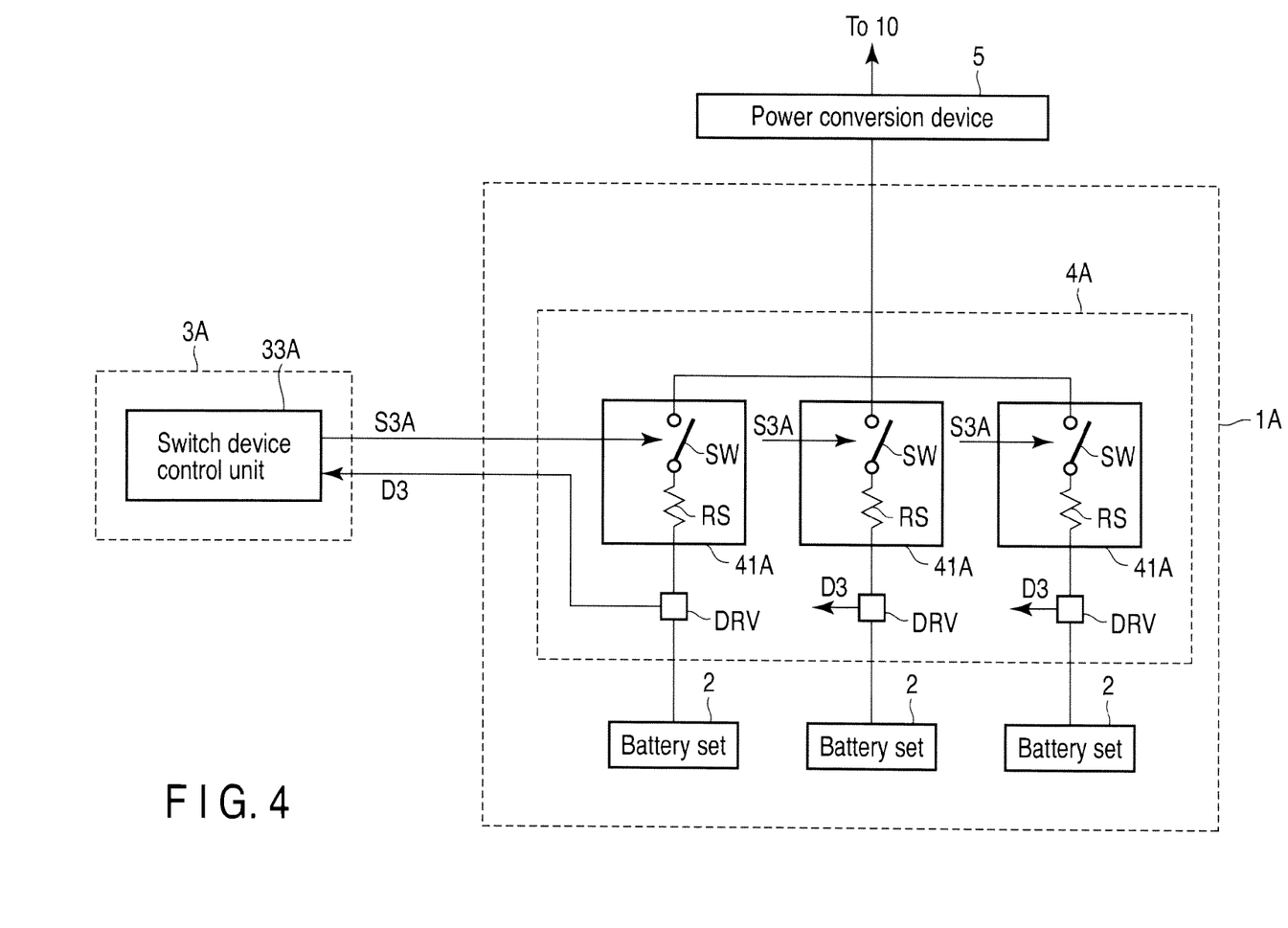
FIG. 4 is a block diagram showing a configuration of a switch device according to the second embodiment.

FIG. 4 is a block diagram showing a configuration of a switch device 4A according to the second embodiment.

A power-fluctuation reducing apparatus 1A according to the present embodiment is configured by replacing a switch device 4 in the power-fluctuation reducing apparatus 1 according to the first embodiment shown in FIG. 1 with a switch device 4A, as well as a power-fluctuation-reducing-system control device 3 with a power-fluctuation-reducing-system control device 3A. In the other respects, the power-fluctuation reducing apparatus 1A is similar to the power-fluctuation reducing apparatus 1 according to the first embodiment.

The power-fluctuation-reducing-system control device 3A is configured by replacing a switch-device control unit 33 in the power-fluctuation-reducing-system control device 3 according to the first embodiment shown in FIG. 2 with a switch-device control unit 33A. Other features than described here are the same as those of the power-fluctuation reducing apparatus 1 according to the first embodiment. In the other respects, the power-fluctuation-reducing-system control device 3A is similar to the power-fluctuation-reducing-system control device 3 according to the first embodiment.

The switch-device control unit 33A performs open/close control for open/close devices SW in place of performing on/off control for switching elements TR. In the other respects, the switch-device control unit 33A is similar to the switch-device control unit 33 according to the first embodiment.

The switch device 4A is configured by replacing chopper circuits 41 in the switch device 4 according to the first embodiment shown in FIG. 3 with direct-current-voltage adjustment circuits 41A. In the other respects, the switch device 4A is similar to the switch device 4 according to the first embodiment.

Each of the direct-current-voltage adjustment circuits 41A includes a series resistor RS and an open/close device SW.

Voltage detectors DRV for detecting voltages input from battery sets 2 are provided in a side of the direct-current-voltage adjustment circuits 41A connected to the battery sets 2. The voltage detectors DRV output the detected input voltages input to the battery sets 2, as the input voltage information D3, to the switch-device control unit 33A.

The switch-device control unit 33A outputs the control signals S3A for adjusting a voltage value to be output to a direct current side of the power conversion device 5, to the direct-current-voltage adjustment circuits 41A as control targets to adjust. The switch-device control unit 33A controls each of the direct-current-voltage adjustment circuits 41A so that no circulation current may flow between the battery sets 2 and that the voltage allocation is uniform between the battery sets 2. Differences between the voltages of the battery sets 2 are adjusted by series resistors RS. The direct-current-voltage adjustment circuits 41A control input voltages from the battery sets 2 as the open/close devices SW, which are constitutive elements of the circuits 41A, are controlled to open/close.

The switch device 4A outputs a direct current power obtained by synthesizing output voltages of the battery sets 2, which have been adjusted by the direct-current-voltage adjustment circuits 41A, to the direct current side of the power conversion device 5.

According to the present embodiment, in place of the chopper circuits 41 configured by switching elements TR, the direct-current-voltage adjustment circuits 41A which are configured by using the series resistor RS and open/close devices SW can be used to construct the power-fluctuation-reducing-system control device 3A. In this manner, the same operations and effects can be obtained as in the first embodiment.

Third Embodiment

Figure 5:
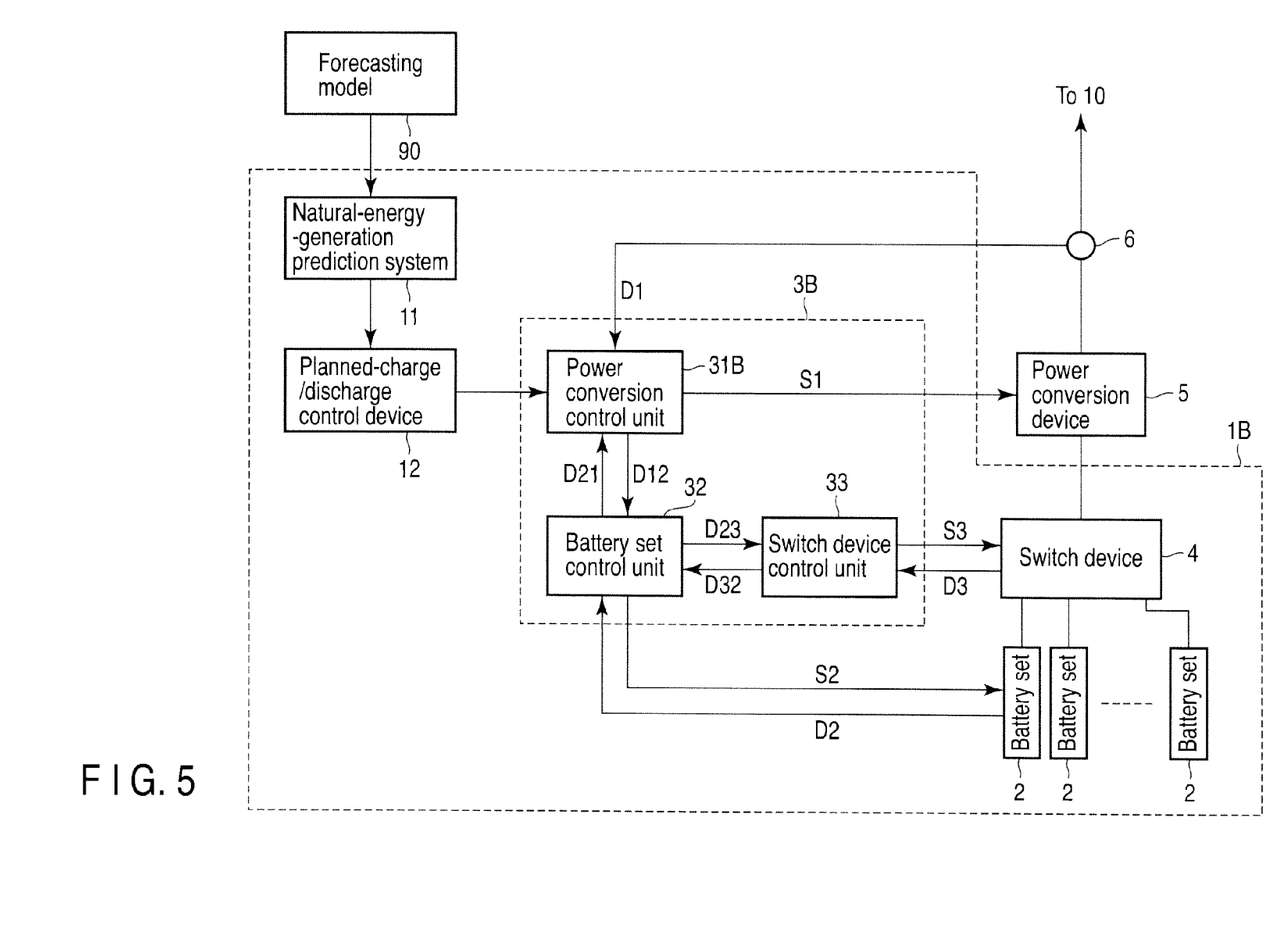
FIG. 5 is a block diagram showing a configuration of a power-fluctuation-reducing apparatus to which a power-fluctuation-reducing-system control device according to the third embodiment is applied.

FIG. 5 is a block diagram showing a configuration of a power-fluctuation reducing apparatus 1B to which a power-fluctuation-reducing-system control device 3B according to the third embodiment is applied.

The power-fluctuation reducing apparatus 1B is configured by replacing a power-fluctuation-reducing-system control device 3 in a power-fluctuation reducing apparatus 1 according to the first embodiment shown in FIG. 2 with a power-fluctuation-reducing-system control device 3B and by adding thereto a natural-energy-generation prediction system 11 and a planned-charge/discharge control device 12. The natural-energy-generation prediction system 11 receives information from a weather forecasting model 90 provided outside the power-fluctuation reducing apparatus 1B. In the other respects, the power-fluctuation reducing apparatus 1B is similar to the power-fluctuation reducing apparatus 1 according to the first embodiment.

The power-fluctuation reducing apparatus 3B is configured by replacing the power-conversion control unit 31 with the power-conversion control unit 31B in the power-fluctuation-reducing-system control device 3 according to the first embodiment shown in FIG. 2. In the other respects, power-fluctuation reducing apparatus 3B is similar to the power-fluctuation reducing apparatus 3 according to the first embodiment.

The weather forecasting model 90 is a numerical forecasting model which supplies weather prediction values. The weather forecasting model 90 provides various information concerning various types of weather, such as wind velocity vectors and air pressures. For example, the weather forecasting model 90 is a system, such as a meso scale model (MSM) or a global spectral model (GSM), which is published by a meteorological agency. The meso scale model deals with the atmosphere above Japan and neighboring seas. The global numerical weather prediction model is a model which deals with atmosphere of the whole earth. These numerical forecasting and prediction models provide weather prediction values analyzed at grid points at intervals of 55 to 20 km.

The natural-energy-generation prediction system 11 extracts weather prediction values such as a wind direction, an air capacity, and sunlight, which influence power generation of a wind power generator 7 at a position or in an area where the wind power generator 7 of the power generation system 10 is provided, from information provided from the weather forecasting model 90. The natural-energy-generation prediction system 11 predicts a power generation quantity of the wind power generator 7, based on the extracted weather prediction values. The natural-energy-generation prediction system 11 transmits the predicted power generation quantity of the wind power generator 7 to the planned-charge/discharge control device 12.

The planned-charge/discharge control device 12 calculates a target charge amount or a target discharge amount of the power-fluctuation reducing apparatus 1B, based on the power generation quantity of the wind power generator 7 received and predicted by the natural-energy-generation prediction system 11. The planned-charge/discharge control device 12 plans a target charge amount or a target discharge amount per time period, based on the calculated target charge amount or target discharge amount. The planned-charge/discharge control device 12 outputs, to the power-conversion control unit 31B, a command concerning charge/discharge for achieving the target charge amount and target discharge amount in accordance with the plan. For example, the command concerning charge/discharge is a command value of SOC (SOC of a total sum of all battery sets 2) of the power-fluctuation reducing apparatus 1B.

The power-conversion control unit 31B outputs information D12 for requesting the battery-set control unit 32 to make the battery sets 2 charge/discharge electricity, based on the command concerning charge/discharge, which has been received from the planned-charge/discharge control device 12.

The power-conversion control unit 31B performs control to charge the power-fluctuation reducing apparatus 1B if the SOC of the power-fluctuation reducing apparatus 1 is lower than the SOC planned by the planned-charge/discharge control device 12. The power conversion control unit 31B performs control to make the power-fluctuation reducing apparatus 1B discharge electricity if the SOC of the power-fluctuation reducing apparatus 1 is higher than the SOC planned by the planned-charge/discharge control device 12. If the power generation quantity of the wind power generator 7 is smaller than planned by the planned-charge/discharge control device 12, the power-conversion control unit 31B makes the power-fluctuation reducing apparatus 1B discharge electricity, thereby to supply a shortage of electric power of the power generation system 10. If the power generation quantity of the wind power generator 7 is higher than planned by the planned-charge/discharge control device 12, the power-conversion control unit 31B charges the power-fluctuation reducing apparatus 1B, thereby to absorb excessive electric power of the power generation system 10. The power-conversion control unit 31B controls the power conversion device 5 in accordance with charge/discharge control of the power-fluctuation reducing apparatus 1B.

Figure 6:
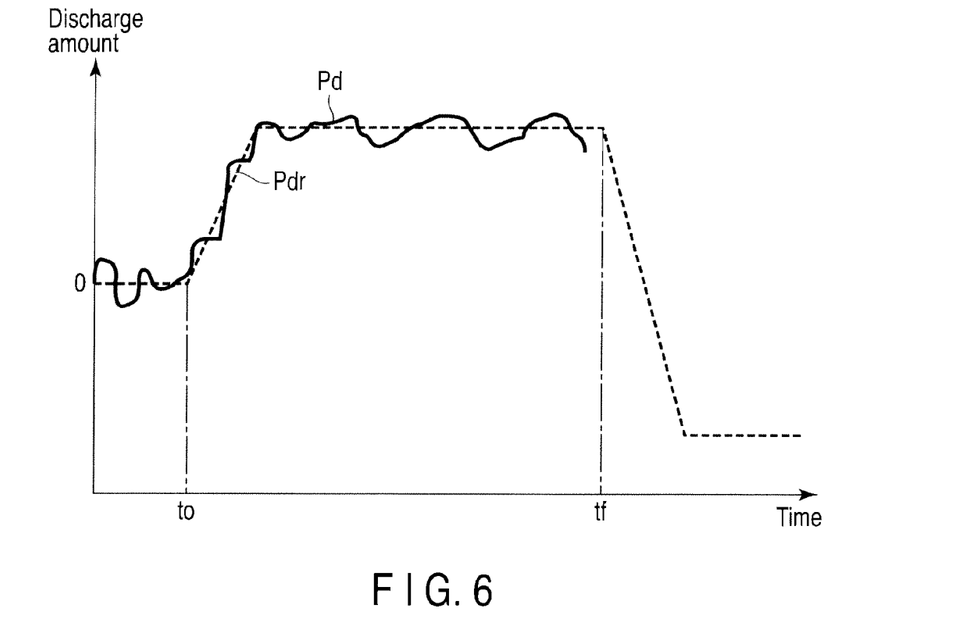
FIG. 6 is a graph showing discharge control of the power-fluctuation reducing apparatus by a planned-charge/discharge control device according to the third embodiment.
Figure 7:
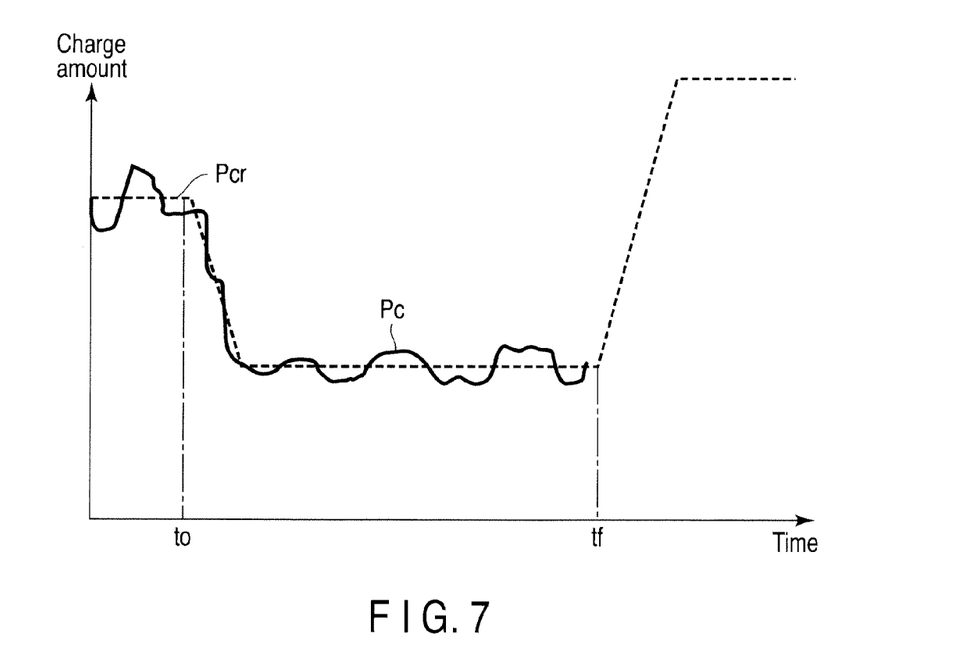
FIG. 7 is a graph showing charge control of the power-fluctuation reducing apparatus according to the third embodiment.

FIG. 6 is a graph showing discharge control of the power-fluctuation reducing apparatus 1B by the planned-charge/discharge control device 12 according to the embodiment. FIG. 7 is a graph showing charge control of the power-fluctuation reducing apparatus 1B by the planned-charge/discharge control device 12 according to the present embodiment.

Referring to FIGS. 6 and 7, descriptions will be made below of the charge/discharge control of the power-fluctuation reducing apparatus 1B when a strong wind is predicted at a spot where the wind power generator 7 is installed.

Based on weather prediction values provided by the weather forecasting model 90, the natural-energy-generation prediction system 11 predicts a strong wind at the spot where the wind power generator 7 is installed. The natural-energy-generation prediction system 11 predicts a power generation quantity generated from the wind power generator 7 by a strong wind, based on the wind force and wind direction of the predicted strong wind.

The planned-charge/discharge control device 12 plans a target charge amount Pcr and a target discharge amount Pdr, based on the power generation quantity predicted by the natural-energy-generation prediction system 11.

The power-conversion control unit 31B outputs a charge command and a discharge command to the battery-set control unit 32, so as to achieve the target charge amount Pcr and target discharge amount Pdr planned by the planned-charge/discharge control device 12.

Before a time point t0 when the natural-energy-generation prediction system 11 receives weather prediction values which predict a strong wind from the weather forecasting model 90, the power-conversion control unit 31B issues a charge/discharge command so as to achieve a charge target amount Pcr and a discharge target amount Pdr for a normal wind (wherein the discharge target amount Pdr is zero in FIG. 6).

From the time point t0 to a time point tf when a strong wind is predicted to blow, the power-conversion control unit 31B issues a charge/discharge command so as to achieve the charge target amount Pcr and discharge target amount Pdr to prepare for a strong wind.

The target charge amount Pcr to prepare for a strong wind is planned to be lower than the charge target amount Pcr for a normal wind. In this manner, the power-fluctuation reducing apparatus 1B keeps a capacity for charging a power generated from the strong wind.

The target discharge amount Pdr to prepare for a strong wind is planned to be higher than the discharge target amount Pdr for a normal wind. Therefore, the power-fluctuation reducing apparatus 1B discharges adequate electric energy within an upper limit of a quantity under a sales contract for a commercial power system.

After the time point tf, the power-conversion control unit 31B issues a charge/discharge command so as to achieve the target charge amount Pcr and target discharge amount Pdr for suppressing power fluctuation due to a strong wind. In this manner, the power-fluctuation reducing apparatus 1B absorbs (stores) the excess generated power of the wind power generator 7 in accordance with a strong wind (for example, the excess generated power is electric power equivalent to an excess beyond a sales contract).

Conversely, when a weak wind or no wind is predicted, the charge/discharge control of the power-fluctuation reducing apparatus 1B increases the target charge amount Pcr to be higher than the target charge amount Pcr for a normal wind. The charge/discharge control decreases the target discharge amount Pdr to be lower than the target discharge amount Pdr for a normal wind. In this manner, the power-fluctuation reducing apparatus 1B prepares to compensate for a shortage of power generated by the wind power generator 7.

According to the present embodiment, weather such as a wind force or a wind direction at the installation spot of the wind power generator 7 can be predicted by receiving weather prediction values. The power-fluctuation reducing apparatus 1B can predict the power generated by the wind power generator 7, based on the predicted weather. The power-fluctuation reducing apparatus 1B can perform charge/discharge in a planned manner by controlling a plurality of battery sets 2, based on the predicted power generated by the wind power generator 7.

Thus, the power-fluctuation reducing apparatus 1B can increase the use efficiency of natural energy over the medium and long term by performing charge/discharge in a planned manner.

As has been described above, according to each of the embodiments, there is provided a power-fluctuation reducing apparatus in a power generation system, which can be constructed even by using secondary batteries of different styles.

Also in each of the embodiments, a power generator used for the power generation system 10 is the wind power generator 7 although the invention is not limited to this wind power generator. Insofar as a power generator uses natural energy, the power generator often causes power fluctuations in the generated power. Therefore, the power generator of the power generation system 10 as a target to reduce power fluctuation, such as the power-fluctuation reducing apparatus 1, may use a form of natural energy other than wind, such as sunlight. Further, the power generator is not limited to one using natural energy insofar as the power generator may cause fluctuations in the generated power.

Also, in each of the embodiments, a configuration using switching elements TR has been described as a configuration for adjusting direct current voltages output from the battery sets 2. However, the invention is not limited to the configuration of these embodiments. Insofar as the direct current voltages can be adjusted, elements or circuits of any type are available. The second embodiment has been described with reference to a circuit configuration including only one series resistor RS and one open/close device SW. The invention is not limited to this circuit configuration. Any number of series resistors RS or open/close devices SW may be provided or may be combined with other elements or circuits. That is, any configuration is available insofar as the configuration is capable of adjusting direct current voltages output from the battery sets 2 by operating elements each having a function as an open/close device (including a switching element)

Further, in each of the embodiments, the power-fluctuation reducing apparatus 1 may be configured to include either both or none of the battery sets 2 and the power conversion device 5.

Although the third embodiment has been described with reference to the case of using the wind power generator 7, any other power generator using natural energy can be used. For example, in the case of a power generator using sunlight, a power generation quantity can be predicted by predicting sunlight hours and sunlight intensity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power-fluctuation reducing apparatus in a power generation system to control a converter, the converter being connected to the power generation system, connected to a plurality of secondary batteries connected in parallel, and configured to convert a direct current power output from the plurality of secondary batteries into an alternating current power, the power-fluctuation reducing apparatus comprising:
a plurality of direct current voltage adjustment units configured to adjust direct current voltages output from the plurality of secondary batteries, respectively;
a plurality of direct current voltage detectors configured to detect the direct current voltages output from the plurality of secondary batteries, respectively;
a direct current voltage controller configured to control the plurality of direct current voltage adjustment units to adjust the direct current voltages output from the plurality of secondary batteries to make the direct current voltages uniform, based on the direct current voltages detected by the plurality of direct current voltage detectors; and
a power conversion controller configured to control the converter to reduce power fluctuations in the power generation system.

2. The power-fluctuation reducing apparatus according to claim 1, further comprising a secondary battery controller configured to control charge/discharge of the plurality of secondary batteries based on operation states of the plurality of secondary batteries.

3. The power-fluctuation reducing apparatus according to claim 1, further comprising the plurality of secondary batteries.

4. The power-fluctuation reducing apparatus according to claim 1, further comprising the converter.

5. The power-fluctuation reducing apparatus according to claim 1, wherein the plurality of direct current voltage adjustment units are a plurality of direct current choppers.

6. The power-fluctuation reducing apparatus according to claim 1, wherein the plurality of direct current voltage adjustment units are circuits each including a configuration in which a resistor and an open/close device are connected in series.

7. The power-fluctuation reducing apparatus according to claim 1, further comprising:
a weather prediction value obtaining unit configured to obtain a weather prediction value indicating a prediction concerning weather;
a power generation prediction unit configured to predict a power generation amount of the power generation system based on the weather prediction value obtained by the weather prediction value obtaining unit; and
a charge/discharge plan controller configured to control in a planned manner based on the power generation amount predicted by the power generation prediction unit.

* * * * *